United States Patent
Hwang

(10) Patent No.: US 7,532,692 B2
(45) Date of Patent: May 12, 2009

(54) WIRED/WIRELESS COMMUNICATION RECEIVER AND METHOD FOR IMPROVING PERFORMANCE OF EQUALIZER THROUGH MULTIPATH DELAY SPREAD ESTIMATION

(75) Inventor: Sung-Hyun Hwang, Suwon-si (KR)

(73) Assignee: Samsung Electronics Co., Ltd, Suwon-si, Gyeonggi-do (KR)

( * ) Notice: Subject to any disclaimer, the term of this patent is extended or adjusted under 35 U.S.C. 154(b) by 659 days.

(21) Appl. No.: 11/197,222

(22) Filed: Aug. 4, 2005

(65) Prior Publication Data
US 2006/0029164 A1    Feb. 9, 2006

(30) Foreign Application Priority Data
Aug. 4, 2004    (KR) ............... 10-2004-0061420

(51) Int. Cl.
*H03D 3/24*    (2006.01)
(52) U.S. Cl. ............... 375/350; 375/316; 375/219; 455/73
(58) Field of Classification Search .......... 375/350, 375/316, 219; 455/73
See application file for complete search history.

(56) References Cited

U.S. PATENT DOCUMENTS

| | | | | |
|---|---|---|---|---|
| 5,119,401 | A * | 6/1992 | Tsujimoto | ............ 375/233 |
| 6,021,161 | A | 2/2000 | Yamaguchi et al. | |
| 7,133,474 | B2 * | 11/2006 | Ramasubramanian et al. | ............ 375/343 |
| 2002/0176482 | A1 | 11/2002 | Chien | |
| 2002/0181575 | A1 * | 12/2002 | Birru | ............ 375/233 |
| 2003/0021359 | A1 * | 1/2003 | He | ............ 375/316 |
| 2003/0026360 | A1 * | 2/2003 | Ramasubramanian et al. | ............ 375/343 |
| 2003/0058962 | A1 * | 3/2003 | Baldwin | ............ 375/316 |
| 2004/0161029 | A1 * | 8/2004 | Malladi et al. | ............ 375/232 |
| 2005/0036541 | A1 * | 2/2005 | McKown | ............ 375/233 |
| 2005/0159120 | A1 * | 7/2005 | Garg et al. | ............ 455/132 |
| 2006/0125817 | A1 * | 6/2006 | He | ............ 345/213 |

FOREIGN PATENT DOCUMENTS

| | | |
|---|---|---|
| EP | 0851637 | 1/1998 |
| EP | 01 182836 | 2/2002 |
| KR | 010114030 | 12/2001 |

OTHER PUBLICATIONS

English Abstract.

* cited by examiner

*Primary Examiner*—David C Payne
*Assistant Examiner*—Zewdu Kassa
(74) *Attorney, Agent, or Firm*—F. Chau & Associates, LLC

(57) ABSTRACT

A wired/wireless communication receiver includes an equalizer through multipath delay estimation and a signal receiving method. The receiver includes a delay spread estimation unit, a factor updating unit, and an equalizer. The delay spread estimation unit estimates a delay spread value of a received signal and uses a symbol boundary information signal to determine a filtering tap length value and a filtering step size value from an estimated delay spread value. The factor updating unit updates filtering factors using the filtering tap length value and the filtering step size value. The equalizer compensates distortion of the received signal using the filtering factors.

16 Claims, 7 Drawing Sheets

WIRED/WIRELESS COMMUNICATION RECEIVER AND METHOD FOR IMPROVING PERFORMANCE OF EQUALIZER THROUGH MULTIPATH DELAY SPREAD ESTIMATION

BACKGROUND OF THE INVENTION

This application claims priority to Korean Patent Application No. 10-2004-0061420, filed on Aug. 4, 2004, in the Korean Intellectual Property Office, the disclosure of which is incorporated herein in its entirety by reference.

1. Field of the Invention

The present invention relates to a wired/wireless communication system and, more particularly, to a wired/wireless communication receiver including an improved equalizer and a communication method.

2. Description of Related Art

Devices such as computers and mobile communication terminals connected to a LAN (local area network) for wired/wireless communications transmit/receive data using communication signals. A CCK (complementary code keying) signal defined by IEEE 802.11, one of the communication signals, is transmitted/received at a transfer rate of maximum 11 Mbps in a frequency band of 2.4 GHz.

Signals transmitted from a transmitter fade while passing through a multipath channel environment and the fading signals are received by a receiver. The multipath fading causes a signal delay and inter-signal interference. This inter-signal interference generates transmission error and brings about degradation of the performance of the receiver. The receiver needs equalization for compensating signal distortion, interference and energy loss generated when signals are transmitted through a multipath. A transmission theory about radio LAN signals such as the CCK signal is disclosed in detail in U.S. Pat. No. 6,256,508 and U.S. 2002/0159422.

FIG. 1 illustrates a chip, a symbol and a frame of a received signal. Referring to FIG. 1, when a CCK signal is QPSK-modulated (quadrature phase-shift keying-modulated), one symbol can include eight chip codes and each chip code can include signal components having four phases. A plurality of symbols comprise one frame. The signal composition can have different protocols when it is modulated by other modulation methods including BPSK (binary phase-keying) modulation.

FIG. 2 illustrates an example of RMS (root mean square) power delay profile of a signal received through a multipath channel. The signal passing through the multipath channel arrives at a receiver with delay time varying with path lengths Ts through 8Ts. The power of the received signal can be exponentially reduced in response to the delay time. The power of the received signal can be calculated from the magnitude of a CIR (channel impulse response). For example, the four signal components comprising each chip of FIG. 1 appear as a CIR in the receiver.

An equalizer of the receiver uses an FIR (finite impulse response) filter and compensates signal distortion, interference and energy loss caused by multipath delay. The FIR filter generates delay signals, respectively multiplies the delay signals by predetermined coefficients, and sums up the multiplied signals. The delay signals are obtained by delaying an input signal by sampling time. The number of multipliers multiplying the delay signals by the predetermined coefficients or the number of the predetermined coefficients corresponds to the number of taps of the FIR filter. In a long multipath channel environment having a large delay, compensation performance is generally improved as the number of taps is increased. However, in a short multipath channel environment, the compensation performance is not always improved in proportion to the number of taps in the equalizer. In the case where the number of taps of the FIR filter is increased excessively in the short multipath channel environment, signal interference is further increased when delay signals having a large delay are synthesized to degrade the performance of compensating received signals.

SUMMARY OF THE INVENTION

According to an embodiment of the present disclosure, a wired/wireless communication receiver includes a delay spread estimation unit, a factor updating unit, and an equalizer. The delay spread estimation unit estimates a delay spread value of a received signal and uses a symbol boundary information signal to determine a filtering tap length value and a filtering step size value from an estimated delay spread value. The factor updating unit updates filtering factors using the filtering tap length value and the filtering step size value. The equalizer compensates distortion of the received signal using the filtering factors. The receiver can further include a delay unit that delays the received signal input to the delay spread estimation unit and outputs the delayed signal as the received signal input to the equalizer. The delay spread estimation unit decides the filtering tap length value and filtering step size value for every frame.

According to another embodiment of the present disclosure, a signal receiving method for wired/wireless communications estimates a delay spread value of a received signal using a symbol boundary information signal, and decides a filtering tap length value and a filtering step size value from the estimated delay spread value. Furthermore, the method updates filtering factors using the filtering tap length value and the filtering step size value, and compensates distortion of the received signal using the filtering factors.

BRIEF DESCRIPTION OF THE DRAWINGS

Preferred embodiments of the present disclosure will be described below in more detail, with reference to the attached drawings in which.

DETAILED DESCRIPTION OF PREFERRED EMBODIMENTS

Figure 1:
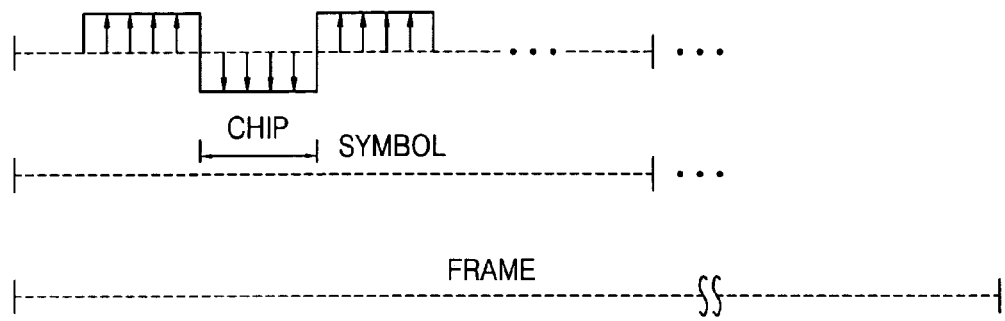
FIG. 1 illustrates a chip, a symbol and a frame of a received signal.

Embodiments of the present disclosure will now be described more fully with reference to the accompanying drawings. The invention may be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

Figure 3:
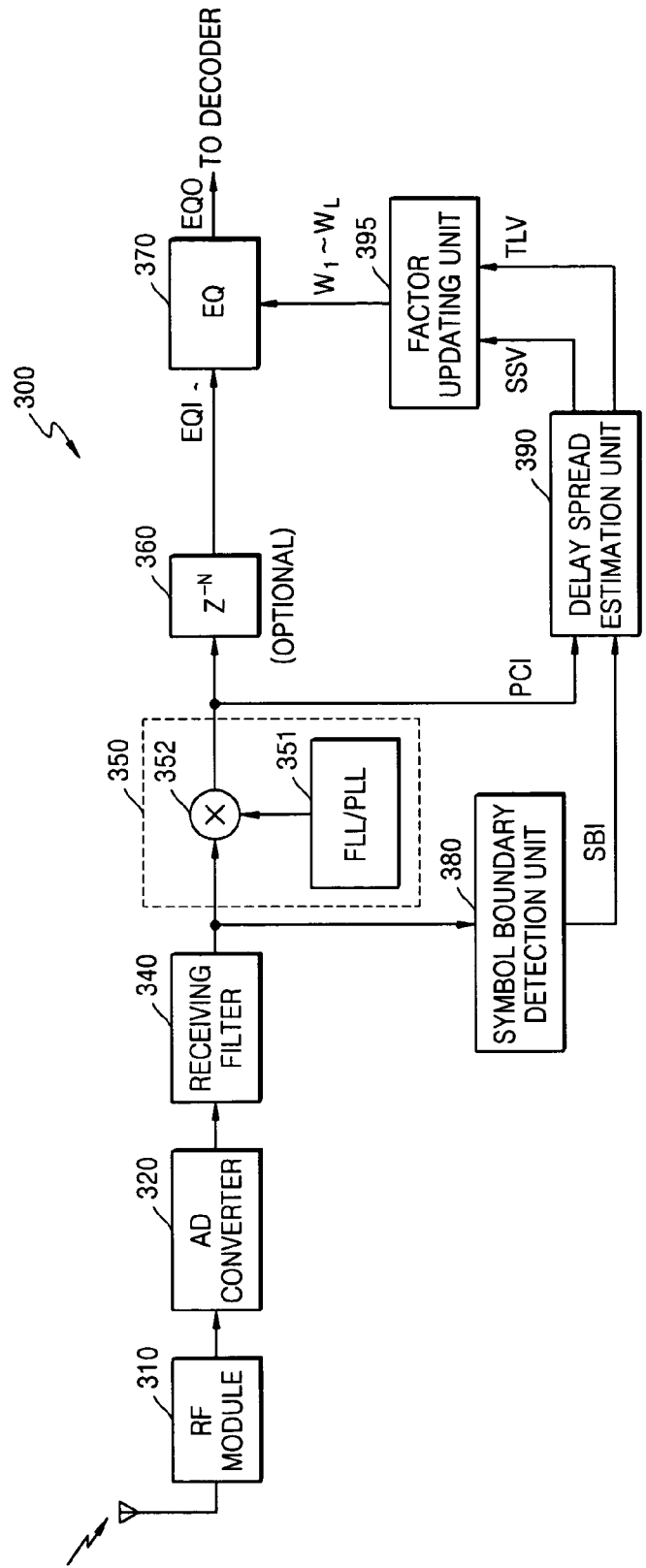
FIG. 3 is a block diagram of a wired/wireless communication receiver according to an embodiment of the present disclosure.

FIG. 3 is a block diagram of a wired/wireless communication receiver 300 according to an embodiment of the present disclosure. Referring to FIG. 3, the receiver 300 includes an RF (radio frequency) module 310, an analog-digital converter 320, a receiving filter 340, a carrier-wave phase offset compensation unit 350, an optional delay unit 360, an equalizer 370, a symbol boundary detection unit 380, an RMS delay spread estimation unit 390, and a factor updating unit 395.

The RF module 310 receives a wired/wireless communication signal, such as a CCK signal from an allocated channel, and extracts a baseband analog signal from the received signal. The analog-digital converter 320 converts the baseband analog signal extracted by the RF module 310 into a digital signal. The receiving filter 340 compensates a signal energy lost in a multipath fading channel and filters the digital signal output from the analog-digital converter 320 to improve CIR characteristic of the received signal.

The carrier-wave phase offset compensation unit 350 removes a phase offset in the output signal of the receiving filter 340 to output a received signal PCI from which the offset has been removed. For this, the carrier-wave phase offset compensation unit 350 includes a phase compensation logic 351 that generates a phase control signal using a FLL (frequency-locked loop) and a PLL (phase-locked loop) and a multiplication logic 352 that multiplies the phase control signal by the output signal of the receiving filter 340. The phase compensation logic 351 can generate the phase control signal using an output signal of a following logic, such as an output signal EQO of the equalizer 370 (connections not shown).

The equalizer 370 compensates distortion of a signal EQI input thereto and outputs the signal EQO. The output signal EQO of the equalizer 370 may be input to an RS (Reed Solomon) decoder. The decoder decodes the signal EQO according to a predetermined method to generate audio data and video data.

The symbol boundary detection unit 380 generates a symbol boundary information signal SBI from the output signal of the receiving filter 340. The output signal of the receiving filter 340 corresponds to a channel impulse response signal for each of signal components comprising a symbol as shown in FIG. 1. Timing information about the start position of each frame and the start position of each symbol can be extracted by analyzing the channel impulse response signal. The generation of the timing information is well-known in the art.

As described above, the number of taps of filters used as the equalizer 370 may be large, such that a long channel multipath delay environment such as an indoor or outdoor environment having a complicated structure can be handled. The number of taps and step sizes of the filters are selected such that the equalizer 370 having a large number of taps has optimized performance for a short channel multipath delay environment such as a general indoor environment.

For this, the RMS delay spread estimation unit 390 estimates an RMS delay spread value $\sigma_\tau$ of the signal PCI output from the carrier-wave phase offset compensation unit 350 and determines a filtering tap length value TLV and a filtering step size value SSV from an estimated RMS delay spread value $\sigma_\tau$. The signal PCI output from the carrier-wave phase offset compensation unit 350 appears as a channel impulse response signal. The RMS delay spread estimation unit 390 estimates the magnitude of the channel impulse response signal, which decreases with delay time, and determines RMS delay spread power from the estimated channel impulse response signal magnitude to extract the RMS delay spread value $\sigma_\tau$. The RMS delay spread estimation unit 390 determines the filtering tap length value TLV and the filtering step size SSV for predetermined symbols (N symbols) for every frame to apply them to the current frame. The RMS delay spread estimation unit 390 will be described in more detail with reference to FIG. 4.

The factor updating unit 395 updates filtering factors $W_1$ through $W_L$ using the filtering tap length value TLV and the filtering step size value SSV determined by the RMS delay spread estimation unit 390. The equalizer 370 compensates distortion of the received signal EQI using the updated filtering factors $W_1$ through $W_L$.

In the construction of FIG. 3, the delay unit 360 delays the transmission of signal EQI by predetermined symbols (N symbols) and inputs the delayed signal to the equalizer 370 while the RMS delay spread estimation unit 390 determines the filtering tap length value TLV and the filtering step size value SSV for the predetermined symbols (N symbols). When the signal delayed by the delay unit 360 is input to the equalizer 370, the equalizer 370 compensates distortion of the delayed signal EQI for the predetermined symbols (N symbols) using the updated filtering factors $W_1$ through $W_L$. Since the delay unit 360 is an optional part, the receiver 300 can be operated without having the delay unit 360. When the receiver 300 does not include the delay unit 360, the equalizer 370 compensates distortion of the signal PCI output from the carrier-wave phase offset compensation unit 350. The equalizer 370 will be explained in more detail with reference to FIGS. 7 and 8.

Figure 4:
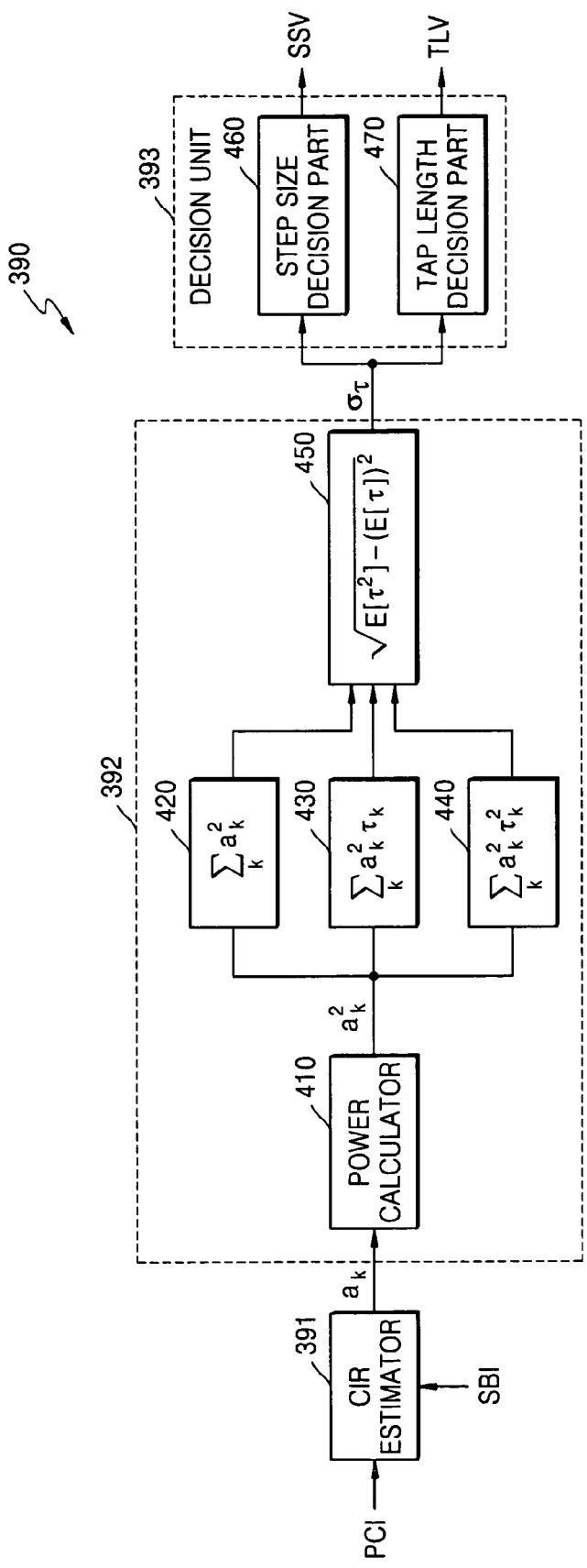
FIG. 4 is a block diagram of the delay spread estimation unit of FIG. 3.

FIG. 4 is a detailed block diagram of the RMS delay spread estimation unit 390. Referring to FIG. 4, the RMS delay spread estimation unit 390 includes a CIR estimator 391, an RMS delay spread calculator 392, and a decision unit 393. The CIR estimator 391 estimates impulse response magnitudes $a_k$, which are averaged for N symbols for every delay time $\tau_k$, from the received signal PCI using the symbol boundary information signal SBI. For example, each symbol has an impulse response magnitude corresponding to delay time $\tau_1$ having no delay, and N symbols include N impulse response magnitudes each corresponding to $\tau_1$, thus, when the N impulse response magnitudes are averaged, an impulse response magnitude $a_1$ averaged for the N symbols at $\tau_1$ is estimated. Similarly, the impulse response magnitudes $a_k$ averaged for the N symbols at the delay time $\tau_k$ can be estimated. The impulse response magnitudes $a_k$ can be estimated using LMS (least mean square), RLS (recursive least square), MMSE (minimum mean square error), ZF (zero forcing) and so on.

In FIG. 4, the RMS delay spread calculator 392 includes an RMS power calculator 410, a first component calculator 420, a second component calculator 430, a third component calculator 440, and an RMS mean delay calculator 450.

Figure 2:
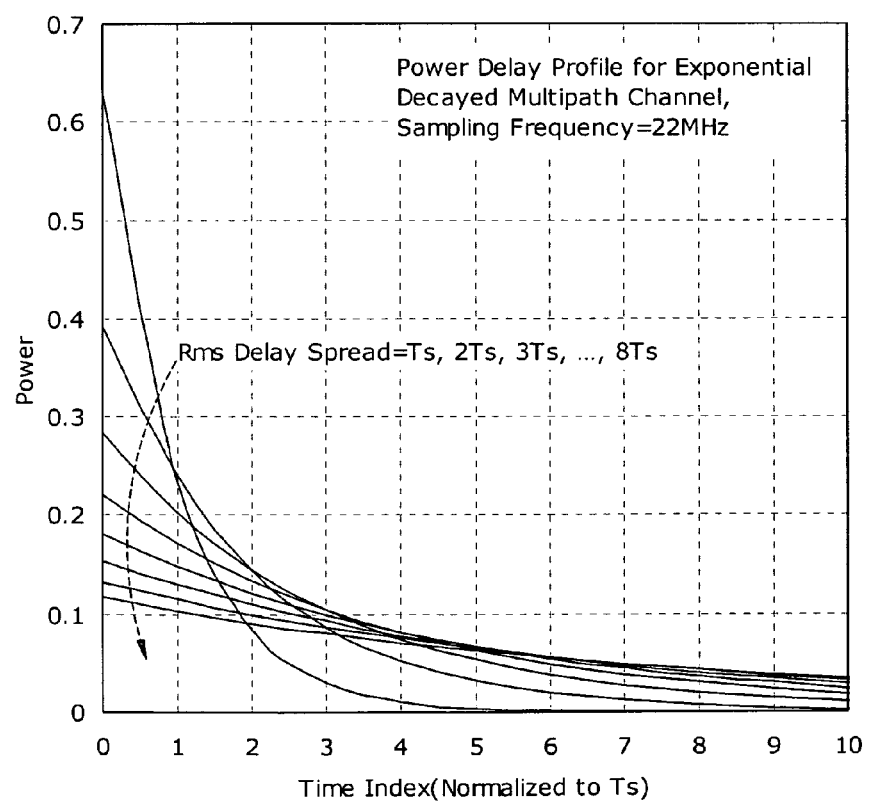
FIG. 2 illustrates an example of RMS power delay profile of a multipath channel.

The power calculator 410 determines squares $a_k^2$ of the impulse response magnitudes $a_k$ averaged for the N symbols, estimated by the CIR estimator 391. Here, the determined squares $a_k^2$ are proportional to the power of the received signal PCI. The power calculator 410 determines the squares $a_k^2$ of the impulse response magnitudes $a_k$ to estimate a power delay profile, for example, as shown in FIG. 2. In FIG. 2, a time index is a value obtained by normalizing the RMS delay spread value $\sigma_\tau$ to a predetermined delay time Ts. FIG. 2 shows a power in response to delay spread. The signal PCI received through a multipath channel has delay time $\tau_k$ in response to a path length. The power of the signal PCI can be exponentially reduced based on the delay time $\tau_k$. The RMS power delay profile as a multipath channel model can have other forms such as a 2-Ray model, a D-K model, and a Salch-Valenzuela model in addition to the exponential form.

The first component calculator 420 sum the squares $a_k^2$ for a delay time sequence index k=1 to N to obtain a first component for determining the delay spread value $\sigma_\tau$, as represented by Expression 1. The second component calculator 430 obtains a second component for determining the delay spread value $\sigma_\tau$ from Expression 2, and the third component calculator 440 obtains a third component for determining the delay spread value $\sigma_\tau$ from Expression 3.

$$\text{First component} = \sum_k a_k^2 \qquad \text{[Expression 1]}$$

$$\text{Second component} = \sum_k a_k^2 \tau_k \qquad \text{[Expression 2]}$$

$$\text{Third component} = \sum_k a_k^2 \tau_k^2 \qquad \text{[Expression 3]}$$

The RMS mean delay calculator 450 determines the delay spread value $\sigma_\tau$ from the determined first, second and third components, as represented by Expressions 4, 5 ad 6. In Expression 6, E[ ] denotes a mean.

$$E[\tau] = \frac{\sum_k a_k^2 \tau_k}{\sum_k a_k^2} \qquad \text{[Expression 4]}$$

$$E[\tau^2] = \frac{\sum_k a_k^2 \tau_k^2}{\sum_k a_k^2} \qquad \text{[Expression 5]}$$

$$\sigma_\tau = \sqrt{E[\tau^2] - (E[\tau])^2} \qquad \text{[Expression 6]}$$

Figure 5:
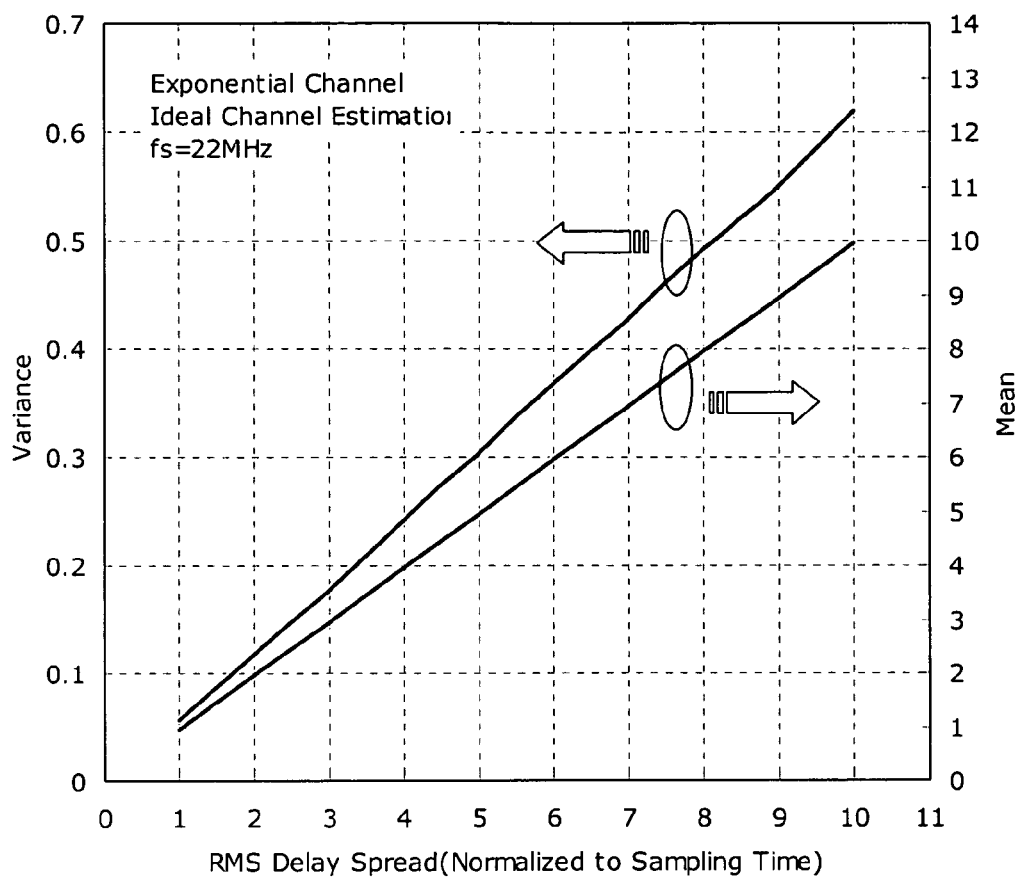
FIG. 5 is a graph illustrating mean and variance characteristics of RMS delay spread values estimated by the delay spread estimation unit.

FIG. 5 shows a mean and a variance of the RMS delay spread value $\sigma_\tau$ in response to delay time normalized to a predetermined sampling time given an ideal channel impulse response estimation in an exponential channel. The mean and variance curves allow for analysis of a statistical characteristic of the delay spread value $\sigma_\tau$ estimated by the RMS delay spread calculator 392. Here, a sampling frequency is 22 MHz. It can be known from the mean characteristic that accurate RMS delay spread value $\sigma_\tau$ can be estimated for input RMS delay spread. The variance is increased as the input RMS delay spread is increased, approaching approximately 0.62 when the input RMS delay spread is 10.

Figure 6:
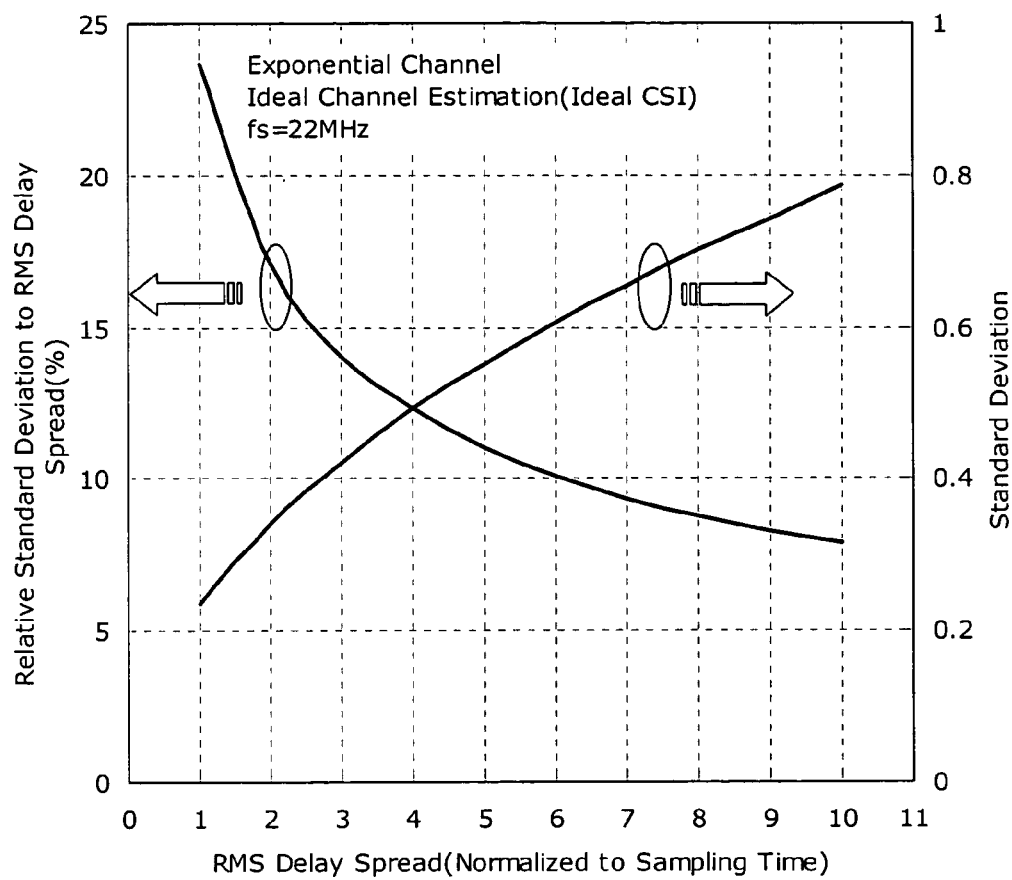
FIG. 6 is a graph illustrating a standard deviation of delay spread values estimated by the delay spread estimation unit and a relative standard deviation to RMS delay spread.

FIG. 6 shows a standard deviation and a relative standard deviation to RMS delay spread. Referring to FIG. 6, the standard deviation of the estimated RMS delay spread value $\sigma_\tau$ is increased as the RMS delay spread is increased. The relative standard deviation normalized to RMS delay spread is larger when the RMS delay spread is smaller and smaller when the RMS delay spread is larger. It is known from FIG. 6 that the relative standard deviation is 7% through 23% when the input RMS delay spread is smaller than 10. From this, it can be confirmed that the RMS delay spread calculator 392 can discriminate longer delays and shorter delays from each other.

When the RMS delay spread calculator 392 determines the delay spread value $\sigma_\tau$ using the impulse response magnitudes $a_k$ averaged for the N symbols, the decision unit 393 determines the filtering tap length value TVL and the filtering step size value SSV from the delay spread value $\sigma_\tau$. The decision unit 393 includes a step size decision part 460 and a tap length decision part 470. The step size decision part 460 can extract a register storage value corresponding to the delay spread value $\sigma_\tau$ to output it as the filtering step size value SSV. The tap length decision part 470 can extract another register storage value corresponding to the delay spread value $\sigma_\tau$ to output it as the filtering tap length value TLV.

Figure 7:
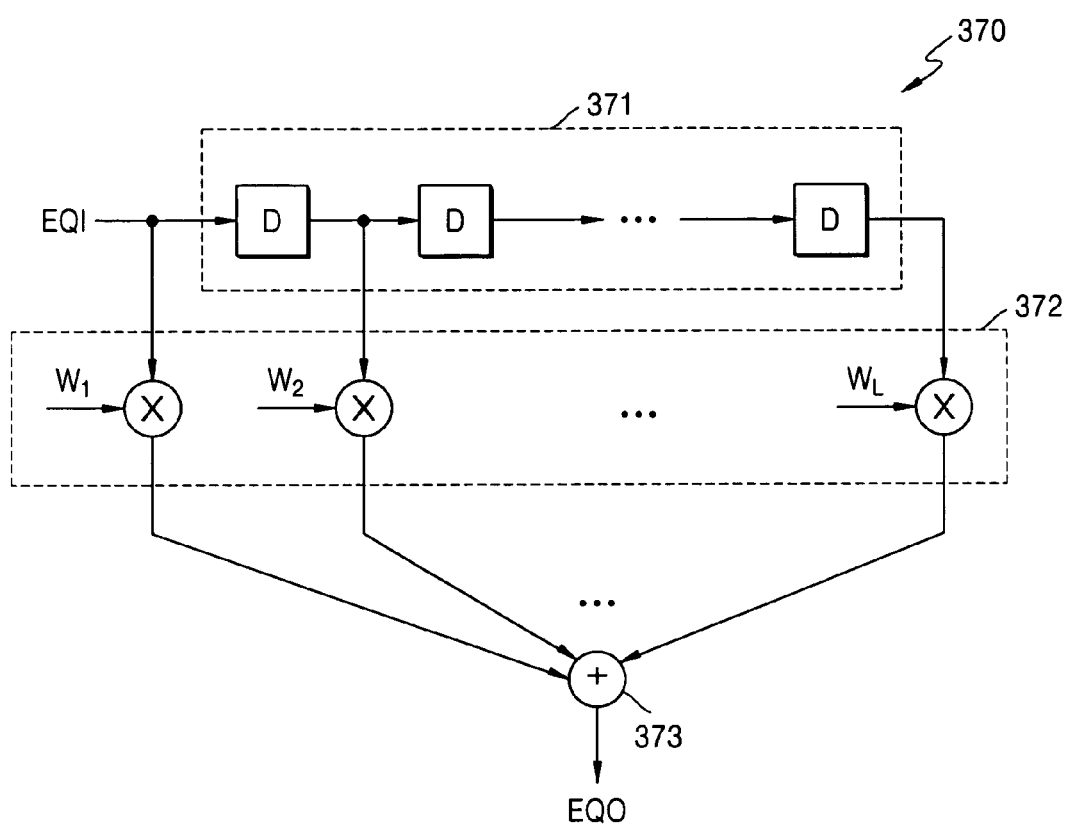
FIG. 7 is a block diagram of a general equalizer having a simple structure.

FIG. 7 is a block diagram of a general equalizer 370. Referring to FIG. 7, the equalizer 370 includes a delayer 371, a multiplication unit 372, and an adder 373. A filter for the equalizer 370 is a FIR (finite impulse response) filter. The delayer 371 includes a plurality of serially connected delay circuits that delay an input signal by sampling time and generates a plurality of delay signals obtained by delaying the received signal EQI by the sampling time. The multiplication unit 372 includes a plurality of multipliers and respectively multiplies the delay signals generated by the delayer 371 by the filtering factors $W_1$ through $W_L$. The number of the multipliers included in the multiplication unit 372 and the number of the filtering factors $W_1$ through $W_L$ corresponds to the number taps of the FIR filter. As the number of taps of the FIR filter, the performance of the filter is improved.

The filtering factors $W_1$ through $W_L$ are output from the factor updating unit 395 of FIG. 3. The factor updating unit 395 updates the filtering factors $W_1$ through $W_L$ using the filtering tap length value TLV and the filtering step size value SSV, which are determined by the RMS delay spread estimation unit 390. The factor updating unit 395 can make parts of the filtering factors $W_1$ through $W_L$, which are multiplied by signals having longer delay, zero in response to the filtering tap length value TLV and determine new values of factors that are not zero in response to the step size value SSV. The new filtering factors can be determined by a function of the filtering factors before being updated and the step size value SSV. The adder 373 add the values multiplied by the multiplication unit 372 to generate the signal EQO obtained by compensating distortion of the received signal PCI.

Figure 8:
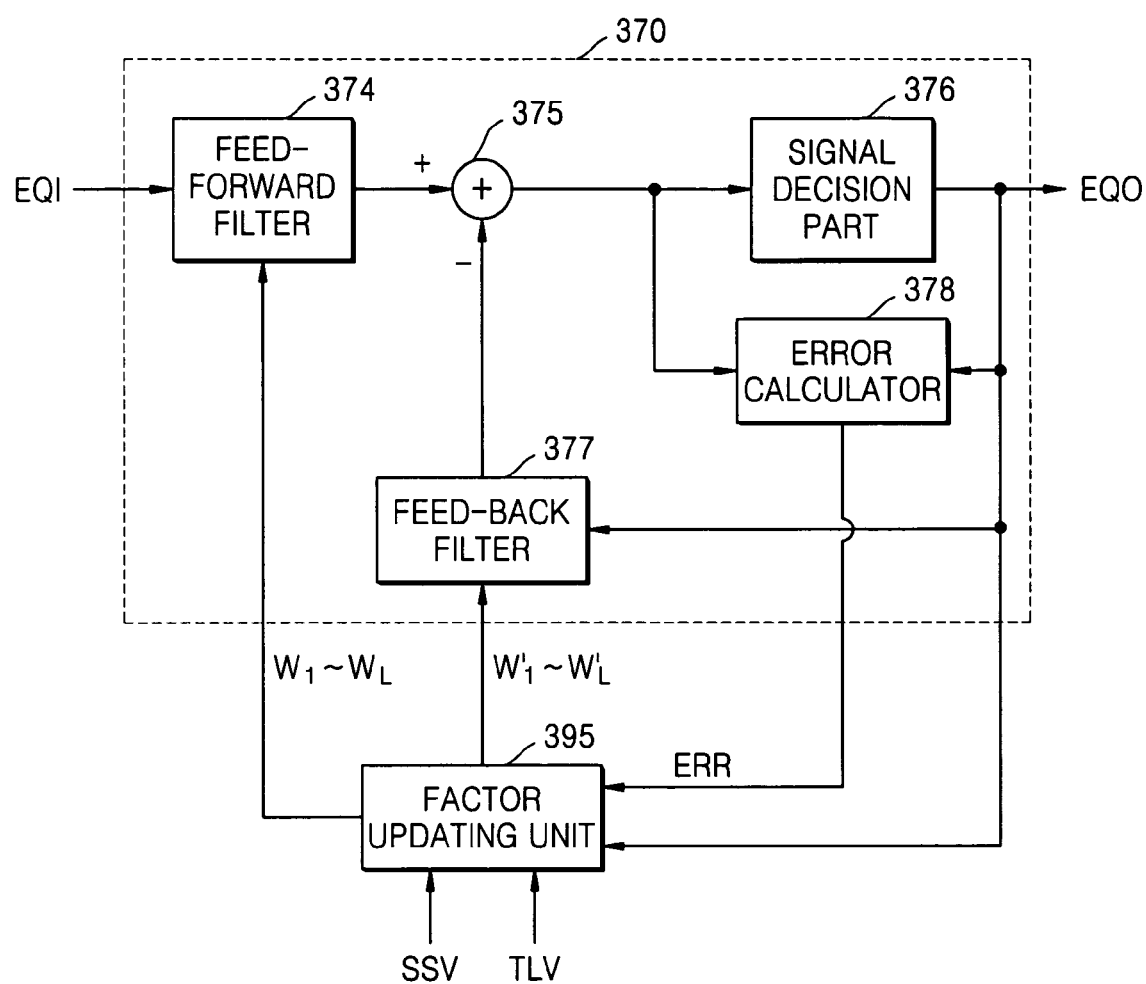
FIG. 8 is a block diagram showing the relationship of a decision feedback equalizer and a factor updating unit.

FIG. 8 is a block diagram showing the relationship of a decision feedback equalizer 370 and the factor updating unit 395. Referring to FIG. 8, the decision feedback equalizer 370 includes a feed-forward filter 374, a subtractor 375, a signal decision part 376, a feed-back filter 377, and an error calculator 378.

The feed-forward filter 374 executes a first FIR filtering for the received signal EQI using the filtering factors $W_1$ through $W_L$ output from the factor updating unit 395. The feed-forward filter 374 has the FIR filter structure shown in FIG. 7. The feed-back filter 377 carries out a second FIR filtering for the output signal of the signal decision part 376 using the filtering factors $W_1$ through $W_L$ output from the factor updating unit 395. The subtractor 375 subtracts the signal which is filtered by the feed-back filter 377 from the signal filtered by the feed-forward filter 374. The signal decision part 376 compares the output signal of the subtractor with a threshold and determines a logic state in response to the compared result to output the signal EQO obtained by compensating distortion of the received signal EQI. The feed-back filter 377 also has the FIR filter structure shown in FIG. 7. The error calculator 378 outputs a difference between the output signal of the subtractor and the output signal of the signal decision part 376 as an error signal ERR.

The filtering factors $W_1$ through $W_L$ used in the feed-forward filter 374 can be identical to or different from the filtering factors $W_1$ through $W_L$ used in the feed-back filter 377.

The factor updating unit 395 may determine the filtering factors $W_1$ through $W_L$ using the error signal ERR and the distortion-compensated signal EQO in addition to the filtering tap length value TLV and the filtering step size value SSV decided by the RMS delay spread estimation unit 390. The factor updating unit 395 can make parts of the filtering factors $W_1$ through $W_L$, which are multiplied by signals having longer delay, zero in response to the filtering tap length value TLV and decide new values of factors that are not zero in response to the step size value SSV. The new filtering factors can be determined by a function of the filtering factors before updated, the step size value SSV, the error signal ERR and the distortion-compensated signal EQO.

As described above, the wired/wireless communication receiver 300 estimates the delay spread value $\sigma_\tau$ due to multipath delay for every frame on the basis of the RMS delay spread and determines the filtering tap length and the filtering step size for operating the equalizer 370 based on the estimated delay spread value $\sigma_\tau$ to compensate distortion of the received signal by a variable operation of the equalizer 370 in accordance with channel length environment.

The wired/wireless communication receiver 300 according to an embodiment of the present disclosure can optimize the performance of the equalizer designed to have a large number of taps to prepare against a longer multipath delay environment such as an indoor or outdoor environment having a complicated structure, wherein the performance is not deteriorated in a shorter multipath delay environment such as a general indoor environment.

While embodiments of the present disclosure has been particularly shown and described, it will be understood by those of ordinary skill in the art that various changes in form and details may be made therein without departing from the spirit and scope of the present disclosure.

What is claimed is:

1. A wired/wireless communication receiver comprising:
   a delay spread estimation unit estimating a delay spread value of a received signal and using a symbol boundary information signal to determine a filtering tap length value and a filtering step size value from an estimated delay spread value,
   wherein the delay spread estimation unit comprises:
      a Channel Impulse Response (CIR) estimator estimating impulse response sizes, which are averaged for a predetermined number of symbols by delay time, from the received signal using the symbol boundary information signal;
      a delay spread calculator determining the delay spread value using the impulse response sizes averaged for the predetermined number of symbols, wherein the delay spread calculator determines the delay spread value from the following expressions:

$$E[\tau] = \frac{\sum_k a_k^2 \tau_k}{\sum_k a_k^2}, E[\tau^2] = \frac{\sum_k a_k^2 \tau_k^2}{\sum_k a_k^2}, \text{ and } \sigma_\tau = \sqrt{E[\tau^2] - (E[\tau])^2},$$

where $E[\ ]$ is a mean, k is a delay time sequence index, $\tau_k$ is the delay time, $a_k$ is an impulse response size averaged for N symbols at $\tau_k$, and $\sigma_\tau$ is the estimated delay spread value; and
      a decision unit determining the filtering tap length value and the filtering step size value from the delay spread value;
   a factor updating unit updating filtering factors using the filtering tap length value and the filtering step size value; and
   an equalizer compensating distortion of the received signal using the filtering factors.

2. The wired/wireless communication receiver of claim 1, further comprising a delay unit, connected in parallel with the delay spread estimation unit, delaying the received signal and outputting the delayed signal as the received signal input to the equalizer.

3. The wired/wireless communication receiver of claim 1, wherein the delay spread estimation unit determines the filtering tap length value and the filtering step size value for every frame.

4. The wired/wireless communication receiver of claim 1, wherein the equalizer comprises:
   a delayer generating a plurality of delay signals obtained by delaying the received signal by sampling time;
   a multiplication unit respectively multiplying the delay signals by corresponding filtering factors among the filtering factors; and
   a summing unit summing multiplied values of the multiplication unit to generate a distortion-compensated signal.

5. The wired/wireless communication receiver of claim 1, wherein the equalizer comprises:
   a feed-forward filter carrying out a first FIR filtering for the received signal using the filtering factors;
   a subtractor subtracting a second-FIR-filtered signal from the first-FIR-filtered signal;
   a signal decision unit comparing an output signal of the subtractor with a threshold and determining a logic state based on a compared result to output a distortion-compensated signal; and
   a feed-back filter carrying out a second FIR filtering for an output signal of the signal decision unit using the filtering factors.

6. The wired/wireless communication receiver of claim 5, wherein the equalizer further comprises an error calculator that outputs a difference between the output signal of the subtractor and the output signal of the signal decision unit as an error signal.

7. The wired/wireless communication receiver of claim 6, wherein the factor updating unit determines the filtering factors using the error signal and the distortion-compensated signal in addition to the filtering tap length value and the filtering step size value.

8. The wired/wireless communication receiver of claim 7, wherein the filtering factors used in the feed-forward filter are different from the filtering factors used in the feed-back filter.

9. A signal receiving method for wired/wireless communications comprising:
   estimating a delay spread value of a received signal using a symbol boundary information signal by a delay spread estimation unit,
   wherein the estimating the delay spread value comprises:
      estimating impulse response sizes, which are averaged for a predetermined number of symbols by delay time, from the received signal using the symbol boundary information signal; and
      determining the delay spread value using the impulse response sizes averaged for the predetermined number of symbols, wherein the delay spread value is determined from the following expressions:

$$E[\tau] = \frac{\sum_k a_k^2 \tau_k}{\sum_k a_k^2}, E[\tau^2] = \frac{\sum_k a_k^2 \tau_k^2}{\sum_k a_k^2}, \text{ and } \sigma_\tau = \sqrt{E[\tau^2] - (E[\tau])^2},$$

where E[ ] is a mean, k is a delay time sequence index, $\tau_k$ is the delay time, $a_k$ is an impulse response size averaged for N symbols at $\tau_k$, and $\sigma_\tau$ is the estimated delay spread value;

determining a filtering tap length value and a filtering step size value from an estimated delay spread value;

updating filtering factors using the filtering tap length value and the filtering step size value; and compensating distortion of the received signal using the filtering factors.

10. The signal receiving method of claim 9, further comprising delaying the received signal used for estimating the delay spread value and outputting a delayed received signal as the received signal used for compensating the distortion.

11. The signal receiving method of claim 9, wherein the filtering tap length value and the filtering step size value are determined for every frame.

12. The signal receiving method of claim 9, wherein the compensating the distortion comprises:

generating a plurality of delay signals obtained by delaying the received signal by sampling time;

multiplying, respectively, the delay signals by corresponding filtering factors among the filtering factors; and summing multiplied values of the delay signals and filtering factors to generate a distortion-compensated signal.

13. The signal receiving method of claim 9, wherein the compensating the distortion comprises:

carrying out a first FIR filtering for the received signal using the filtering factors;

subtracting a second-FIR-filtered signal from a first-FIR-filtered signal;

comparing a subtraction result with a threshold and determining a logic state based on a compared result to output a distortion-compensated signal; and carrying out a second FIR filtering for the distortion-compensated signal using the filtering factors.

14. The signal receiving method of claim 13, wherein the compensating the distortion further comprises outputting a difference between the subtraction result and the distortion-compensated signal as an error signal.

15. The signal receiving method of claim 14, wherein the error signal and the distortion-compensated signal are used in addition to the filtering tap length value and filtering step size value for determining the filtering factors.

16. The signal receiving method of claim 15, wherein the filtering factors used for the first FIR filtering are different from the filtering factors used for the second FIR filtering.

* * * * *